United States Patent Office 3,222,399
Patented Dec. 7, 1965

3,222,399
CYCLOPENTYLBENZYLAMINES
John Andrew Faust and Melville Sahyun, Santa Barbara, Calif.; said Faust assignor to Melville Sahyun, doing business as Sahyun Laboratories, Santa Barbara, Calif.
No Drawing. Filed Nov. 2, 1964, Ser. No. 408,373
6 Claims. (Cl. 260—570.5)

This invention relates to compositions of matter classified in the art of chemistry as cyclopentylbenzylamines and to processes for making such compositions.

This application is a continuation-in-part of application Serial No. 144,317, filed October 11, 1961, and now abandoned.

The invention sought to be patented, in its composition aspect, is described as residing in the concept of a chemical compound having a molecular structure in which an alpha-cyclopentylbenzylamine is substituted on the benzene ring by a halogen atom and on the amino group by lower-alkyl radicals.

As used herein, the term "lower-alkyl" means saturated monovalent aliphatic radicals of the general formula $-C_nH_{2n+1}$ wherein "$n$" represents an integer less than five and is inclusive of both straight-chain and branched-chain radicals.

The physical embodiments of the subject matter sought to be patented, in their free base form, are high-boiling, oily liquids which possess the inherent applied use characteristic of exhibiting central nervous stimulant, bronchodilator, cardiovascular and anorrexigenic activity as shown by standard testing procedures.

The manner and process of making and using the invention is illustrated by the following general description and examples, which set forth the best mode contemplated by us of carrying out the invention so as to enable any person skilled in the art of chemistry to make and use the same.

The free base form of the compound of the present invention may be illustrated by the following general formula:

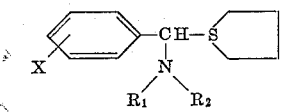

wherein $R_1$ and $R_2$ represent lower-alkyl radicals, particularly lower alkyl radicals having 1 to 4 carbon atoms, X represents halogen, particularly chlorine or bromine, substituted ortho, meta, or para to the cyclopentyl substituent, and the S indicates that the cyclopentyl ring is fully saturated. The compounds of this invention can be prepared by reacting a cyclohexene oxide with the Grignard reagent of a halogenated benzene, oxidizing the halogenated cyclopentylbenzyl alcohol so obtained by means of potassium dichromate and a mineral acid or other conventional oxidizing agent to a halogenated phenylcyclopentyl ketone, reductively aminating the ketone, for example, by means of formic acid and formamide to obtain a halogenated cyclopentylbenzylamine, and finally alkylating the intermediate benzylamine compound.

Alternatively, the halogenated phenylcyclopentyl ketone can be synthesized by starting with a halogenated benzaldehyde which gives a halogenated benzaldoxime when reacted with hydroxylamine hydrochloride in the presence of sodium bicarbonate. The aldoxime yields a halogenated benzonitrile upon refluxing in acetic anhydride. The halogenated phenylcyclopentyl ketone can be obtained by the addition of cyclopentyl magnesium bromide to the nitrile followed by hydrolysis. The ketone made by either method is reductively aminated to the intermedite amine by treatment with ammonia and hydrogen or, preferably, by the Leuckart reaction.

In yet another alternative process, one starts with the halogenated cyclopentylbenzyl alcohol obtained as described above by the reaction of cyclohexene oxide with the Grignard reagent of a halogenated benzene or by reduction of the corresponding halogenated phenyl cyclopentyl ketone. The ketone may be reduced by hydrogen in the presence of a suitable catalyst, by the Meerwein-Ponndorf-Verley reduction or preferably by the action of lithium aluminum hydride. The resultant halogenated cyclopentylbenzyl alcohol is then converted to the corresponding halide in the conventional manner by means of thionyl chloride or phosphorus tribromide. The halide atom so introduced is then displaced by reaction with an amine of the formula $H-NR_1R_2$ wherein $R_1$ and $R_2$ are defined as above and wherein $NR_1R_2$ represents the dilower-alkylamino desired in the compounds of the present invention.

The acid-addition salts of this invention can be prepared in a conventional manner by reacting the corresponding free bases of this invention with the usual inorganic acids, for example, hydrochloric, hydrobromic, hydriodic, sulfuric, and phosphoric; or an organic acid, for example, acetic, citric, and benzoic. The acid-addition salts of this invention are readily interconvertible into the free base form and are fully equivalent thereto; the conventional treatment of the acid-addition salts with an inorganic base regenerates the free base form. Hence all acid-addition salts are useful for the preparation of the free base and for the preparation of other acid-addition salts.

The quaternary ammonium salts of the present invention can be obtained by addition to the corresponding free bases of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, methiodide, ethobromide, propobromide, benzochloride, benzobromide, methosulfate, methobenzenesulfonate, and metho-p-toluene sulfonate salts, respectively.

While the free bases of this invention have the same general pharmacological properties as their acid-addition and quaternary ammonium salts, they are more often utilized in the preparation of such salts rather than directly for their pharmaceutical effects.

The foregoing discussion is offered to illustrate methods suitable for the practice of our invention and not to limit its scope. Our invention is further illustrated by the following preparations and examples:

PREPARATION 1.—m-CHLORO-ALPHA-CYCLOPENTYLBENZYL ALCOHOL

The Grignard reagent of 1-bromo-3-chlorobenzene was prepared by reacting 32 grams (0.167 mole) of it in ether with 4 grams (0.167 mole) of magnesium turnings. Cyclohexene oxide, 16 grams (0.163 mole) was added dropwise with stirring to the cooled Grignard reagent. Dry benzene, 200 milliliters, was then added and the ether distilled away until the temperature reached 75 degrees. The benzene solution was refluxed for 2 hours, cooled, and acidified with dilute, cold sulfuric acid. The organic layer was separated, washed with water, dried over anhydrous magnesium sulfate and distilled to obtain 23 grams or a 64 percent yield of m-chloro-alpha-cyclopentylbenzyl alcohol boiling 120–130 degrees at 0.6 millimeter.

PREPARATION 2.—m-CHLOROPHENYL-CYCLOPENTYL KETONE

Potassium dichromate, 20.6 grams, and 16 grams of sulfuric acid were dissolved in 100 milliliters of water. The solution was stirred at about 30 degrees, and 21 grams (0.10 mole) of m-chloro-alpha-cyclopentylbenzyl alcohol (Preparation 1) added dropwise over a 20 minute period. The reaction temperature rose to 55 degrees and then commenced to fall. Stirring was continued for 20 minutes after reaching the maximum temperature. The reaction mixture was extracted twice with ether and the ether solution was washed, dried with magnesium sulfate and distilled. The pale-yellow product weighed 17.4 grams or an 87 percent yield of m-chlorophenylcyclopentyl ketone boiling 120–128 degrees at 0.6 millimeter. The mixed melting point of the 2,4-dinitrophenylhydrazone of this ketone with that of the ketone prepared according to the method of Preparation 3 showed no depression.

PREPARATION 3.—m-CHCLOROPHENYL-CYCLOPENTYL KETONE

Cyclopentyl magnesium bromide was prepared by reacting 38 grams (0.25 mole) of cyclopentyl bromide with 6 grams (0.25 mole) of magnesium in 150 milliliters of dry ether. A solution of 18 grams (0.13 mole) of m-chlorobenbonitrile in 100 milliliters of dry ether was added dropwise at 100 degrees. Benzene was added, the mixture was distilled to remove the ether and the benzene solution was refluxed for 2 hours. About 100 grams of cracked ice was added, followed by 200 milliliters of 6 N hydrochloric acid. The reaction mixture was then refluxed for a further 2 hours to hydrolyze the ketimine hydrochloride. After cooling, the benzene layer was separated and the aqueous layer extracted once with ether. The two extracts were combined, washed, dried and distilled to yield 16 grams or a 68 percent yield of m-chlorophenylcyclopentyl ketone boiling 120–124 degrees at 1.5 millimeters.

The 2,4-dinitrophenylhydrazone melted at 121–123 degrees after recrystallization from ethanol. A mixed melting point with the 2,4-dinitrophenylhydrazone of Preparation 2 was not depresed.

PREPARATION 4.—m-CHLORO-ALPHA-CYCLOPENTYLBENZYLAMINE

A mixture of 17.4 grams (0.083 mole) of m-chlorophenylcyclopentyl ketone (Preparation 2 or 3), 20 milliliters (0.52 mole) of formic acid, and 60 milliliters (1.42 moles) of formamide was refluxed for 20 hours. The mixture was cooled somewhat, 100 milliliters of acetic acid and 110 milliliters of concentrated hydrochloric acid were added and refluxing was continued for 6 hours. The mixture was extracted with benzene and then rendered alkaline with sodium hydroxide solution. The amine was extracted with ether, washed, dried, and distilled. A total of 10 grams or a 57 percent yield of m-chloro-alpha-cyclopentylbenzylamine was obtained, boiled 120–130 degrees at 0.8 millimeter.

Analysis calculated for $C_{12}H_{16}ClN$: N, 6.68; neut. equiv., 210. Found: N, 6.38; neut. equiv., 221.

PREPARATION 5.—p-CHLORO-ALPHA-CYCLOPENTYLBENZYL ALCOHOL

This compound was prepared in the same general manner as was the m-chloro compound described in Preparation 1. In a typical experiment, 36.7 grams or a 68 percent yield of p-chloro-alpha-cyclopentylbenzyl alcohol boiling 125–132 degrees at 0.6 millimeter was obtained from 48 grams of 1-bromo-4-chlorobenzene.

PREPARATION 6.—p-CHLOROPHENYL-CYCLOPENTYL KETONE

This intermediate was made in the same general manner as was the m-chloro analogue described in Preparation 2. In one experiment, 10.5 grams (.05 mole) of p-chloro-alpha-cyclopentylbenzyl alcohol (Preparation 5) was oxidized to give 6.2 grams or a 60 percent yield of p-chlorophenylcyclopentyl ketone boiling 136–144 degrees at 3–5 millimeters.

PREPARATION 7.—p-CHLORO-ALPHA-CYCLOPENAYLBENZYLAMINE

A mixture of 21 grams of p-chlorophenylcyclopentyl ketone (0.1 mole), 20 milliliters (0.52 mole) of formic acid, and 60 milliliters (1.42 moles) of formamide was refluxed for 24 hours. Concentrated hydrochloric acid (200 milliliters) was added and refluxing was continued for 20 hours. The cooled mixture was made alkaline, the amine was extracted with ether and distilled to obtain 13.4 grams or a 64 percent yield of p-chloro-alpha-cyclopentylbenzylamine boiling 116–120 degrees at 0.5 millimeter.

Analysis calculated for $C_{12}H_{16}ClN$: N, 6.68. Found: N, 6.70.

Dry hydrogen chloride was added to 2 grams of the base in ether. After two recrystallizations from isopropyl alcohol, 0.4 gram of the white crystalline hydrochloride melting over 310 degrees was obtained.

Analysis calculated for $C_{12}H_{16}ClN \cdot HCl$: N, 5.69; Cl, 14.40. Found: N, 5.77; Cl, 14.52.

The picrate was obtained as fine yellow needles from a heptane-alcohol mixture and melted 213–216 degrees. There was no depression when mixed with a sample of the picrate of p-chloro-alpha-cyclopentylbenzylamine produced via the general method of Preparation 3.

PREPARATION 8.—p-BROMO-ALPHA-CYCLOPENTYLBENZYL ALCOHOL

This preparation was carried out in the same general manner described in Preparation 5. From 60 grams (0.25 mole) of dibromobenzene, there was obtained 29.0 grams of product boiling over a wide range. After careful redistillation, about a 45 percent yield of p-bromo-alpha-cyclopentylbenzyl alcohol boiling 140–148 degrees at 0.8 millimeter was collected.

PREPARATION 9.—p-BROMOPHENYLCYCLOPENTYL KETONE

Twenty-eight grams (0.11 mole) of p-bromo-alpha-cyclopentylbenzyl alcohol (Preparation 8) was oxidized in the manner described in Preparation 6. The product boiled over a wide range and appeared to contain free iodine. The crude product was dissolved in a little ether and shaken with metallic mercury before being redistilled to give 15.0 grams or a 54 percent yield of p-bromophenylcyclopentyl ketone boiling 122–130 degrees at 0.5 millimeter.

PREPARATION 10.—p-BROMO-ALPHA-CYCLOPENTYLBENZYLAMINE

This amine was prepared in the same manner as the p-chloro compound of Preparation 7. From 14.0 grams (0.054 mole) of the ketone, 10.6 grams of p-bromo-alpha-cyclopentylbenzylamine boiling 120–125 degrees at 0.3 millimeter was obtained. Analysis calculated for $C_{12}H_{16}BrN$: Neut. equiv. 254. Found: Neut. equiv. 261.

The hydrochloride salt was prepared from 3.6 grams of the above base by treating a solution in ether with an excess of ethereal hydrogen chloride. After recrystallization from isopropyl alcohol and ether, 2.4 grams of white gritty crystals were obtained. The melting point was indefinite as the material started turning brown at 210 degrees and finally decomposed at 319 degrees.

Analysis calculated for $C_{12}H_{16}BrN \cdot HCl$: N, 4.82; Cl, 12.20. Found: N, 4.68; Cl, 11.97.

PREPARATION 11.—p-CHLORO-ALPHA-CYCLO-PENTYLBENZYL ALCOHOL

To a constantly stirring slurry of 5.18 grams (0.136 mole) of lithium aluminium hydride in 200 milliliters of anhydrous ethylether was added dropwise a solution of 28.2 grams (0.136 mole) of p-chloro-phenylcyclopentyl ketone in 100 milliliters of anhydrous ether. Rate of addition was such that a gentle refluxing was maintained. The mixture was refluxed for 1.5 hours. Under a nitrogen atomsphere and with ice cooling the reaction mixture was decomposed by the dropwise addition of the following solutions:

5.2 milliliters water,
3.9 milliliters 20 percent sodium hydroxide solution,
18.2 milliliters water.

The mixture was then refluxed for an hour. The ether phase was dried over anhydrous sodium sulfate and then removed in vacuo to yield 26.0 grams, 91 percent of the desired compound as a colorless viscous oil boiling 125–129 degrees at 0.7 millimeter.

PREPARATION 12.—p-CHLORO-ALPHA-CYCLO-PENTYLBENZYL BROMIDE

To a constantly stirring solution of 26.0 grams (0.124 mole) of p-chloro-alpha-cyclopentylbenzyl alcohol (Preparation 10) in 150 milliliters anhydrous ethylether was added dropwise a solution of 13.5 grams (0.05 mole) of phosphorous tribromide in 100 milliliters of anhydrous ethyl ether. Addition of phosphorous tribromide took ten minutes. After an hour the solution became cloudy. The mixture was constantly stirred at room temperature for 18 hours. The mixture was treated with two 100 milliliter portions of saturated sodium bicarbonate solution, 100 milliliters water and then dried over anhydrous magnesium sulfate. Removal of solvent in vacuo left 33.5 grams, 99 percent of p-chloro-alpha-cyclopentyl-benzyl bromide melting at 35 degrees.

Example 1.—m-Chloro-alpha-cyclopentyl-N,N-dimethylbenzylamine m-Chloro-alpha-cyclopentylbenzylamine was methylated by refluxing 9.8 grams (.041 mole) of the amine (Preparation 4) with 12 milliliters (0.12 mole) of 37 percent aqueous formaldehyde and 20 milliliters (0.400 mole) of formic acid for 16 hours. After cooling, the reaction mixture was poured into water and extracted with ether. The aqueous solution was rendered alkaline and the liberated amine extracted with ether, washed, dried, and distilled. The water-white distillate weighed 7.7 grams or a 69 percent yield of m-chloro-alpha-cyclopentyl-N,N-dimethylbenzylamine boiling 110–113 degrees at 1.4 millimeter.

Analysis calculated for $C_{14}H_{20}ClN$: N, 5.89. Found: N, 5.86.

The hydrochloride salt was prepared in ether from 6 grams (0.025 mole) of the base. After recrystallization from isopropyl alcohol and ether, a total of 5.7 grams or an 82 percent yield of the hydrochloride as white needles melting 210–211 degrees was obtained.

Analysis calculated for $C_{14}H_{20}ClN \cdot HCl$: Cl, 12.93. Found: Cl, 12.94.

The methobromide was prepared by heating a solution of 1.7 grams (0.007 mole) of the amine and 2 grams (0.02 mole) of methyl bromide in dimethylformamide at 100 degrees for 2 hours. The product was precipitated with ether and recrystallized from isopropyl alcohol and ether. There was obtained 1.6 gram or a 67 percent yield of the methobromide as white crystals melting 196–197 degrees.

Analysis calculated for $C_{14}H_{20}ClN \cdot CH_3Br$: N, 4.21; Br, 24.02. Found: N, 4.28; Br, 23.52.

Example 2.—p-Chloro-alpha-cyclopentyl-N,N-dimethylbenzylamine p-Chloro-alpha-cyclopentylbenzylamine was methylated by refluxing for 22 hours 11.2 grams (0.053 mole) of the amine (Preparation 7) with 12 milliliters (0.15 mole) of formic acid. Excess unreacted starting materials were stripped out under vacuum and the residue poured into water. The aqueous solution was extracted with ether and then rendered alkaline with sodium hydroxide. The liberated amine was washed, dried, and distilled to obtain 9.1 grams or a 73 percent yield of p-chloro-alpha-cyclopentyl-N,N-dimethylbenzylamine boiling 115–119 degrees at 0.5 millimeter.

Analysis calculated for $C_{14}H_{20}ClN$: N, 5.89; neut. equiv., 238. Found: N, 5.97; neut. equiv., 249.

The hydrochloride salt was prepared in ether from 6 grams (0.025 mole) of the base. After recrystallization from isopropyl alcohol and ether, a total of 5.1 grams or a 74 percent yield of the hydrochloride as white crystals melting 190–192 degrees was obtained.

Analysis calculated for $C_{14}H_{20}ClN \cdot HCl$: N, 5.11; Cl, 12.93. Found: N, 5.12; Cl, 12.89.

Example 3.—p-Bromo-alpha-cyclopentyl-N,N-dimethylbenzylamine

Using the general method of the previous example, p-bromo-alpha-cyclopentyl-N,N-dimethylbenzylamine may be prepared from p-bromo-alpha-cyclopentyl-benzylamine (Preparation 10).

Example 4.—p-Chloro-alpha-cyclopentyl-N,N-dimethylbenzylamine hydrochloride

To a solution of 31.65 grams (0.116 mole) of p-chloro-alpha-cyclopentylbenzyl bromide (Preparation 11) in 100 milliliters of ethanol was added 45 milliliters of a 40 percent aqueous dimethylamine solution (18 grams, 0.40 mole). The resulting mixture was heated in a pressure bottle to 100 degrees whereupon solution resulted. After 16 hours the reaction solution was concentrated in vacuo to remove all ethanol. The mixture was made strongly acid with dilute hydrochloric acid and extracted with ethylether. The aqueous acid phase was made alkaline with 5 percent sodium hydroxide solution and extracted with ethyl ether. The ether extract yielded on concentration 7.94 grams, 29 percent of p-chloro-alpha-cyclopentyl-N,N-dimethylbenzylamine. The infrared spectrum was identical to that of the p-chloro-alpha-cyclopentyl-N,N-dimethylbenzylamine of Example 2.

The 7.49 grams of p-chloro-alpha-cyclopentyl-N,N-dimethylbenzylamine was dissolved in 10 milliliters absolute ethanol and treated with 20 milliliters of 2.41 N ethanolic hydrochloric acid. The solution was freed of solvent in vacuo and then dried under high vacuum. The gummy residue was taken up in 20 milliliters ethyl methyl ketone and allowed to crystallize. The desired hydrochloride was obtained in 18.7 percent (5.93 grams) yield, and melted 188–190 degrees. The mixed melting point with the hydrochloride of Example 2 was undepressed; their infrared spectra were identical.

The alpha-cyclopentyl halobenzylamine compounds of this invention exhibited central nervous system stimulant activity as demonstrated by the shortening of the barbiturate-induced hypnosis time when tested in animals. The standard test procedure is summarized as follows: The animals are administered, intraperitoneally, a standard hypnotic dose of a barbiturate. At a predetermined later time, the test compound is administered subcutaneously. The duration of sleep time is determined for a control group administered only the barbiturate and for the experimental group administered barbiturate and the test compound. Central nervous system stimulants shortened sleep time.

The alpha-cyclopentylbenzylamine compounds of this invention, substituted on the benzene ring by a halogen atom and on the amino group by lower-alkyl radicals, in addition to their central nervous system stimulant activity, also exhibit anorexigenic, bronchodilator and cardiovascular effects when tested in experimental animals. For example, m-chloro-alpha-cyclopentyl-N,N-dimethylbenzene hydrochloride gives more pronounced bronchodilation than epinephrine, and exhibits a general d-amphetamine-like activity.

Following the above procedures, the following compounds of this invention are prepared:

m-Chloro-α-cyclopentyl-N,N-diethylbenzylamine,
p-Chloro-α-cyclopentyl-N,N-diethylbenzylamine,
p-Fluoro-α-cyclopentyl-N,N-dimethylbenzylamine.

Various modifications of this invention will suggest themselves to one skilled in the art and the invention is not to be limited to the above-offered examples. The subject mater which the applicants regard as their invention is particularly pointed out and distinctly claimed as follows.

We claim:
1. A compound of the formula

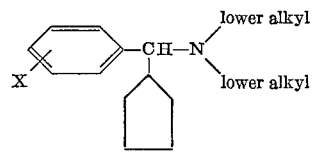

wherein X is selected from the group consisting of chlorine, bromine and fluorine.

2. Compounds according to claim 1 wherein the halogen atom is chlorine.

3. Compounds according to claim 1 wherein the halogen atom is bromine.

4. m-Chloro - alpha - cyclopentyl-N,N-dimethylbenzylamine.

5. p-Chloro - alpha - cyclopentyl-N,N-dimethylbenzylamine.

6. p-Bromo - alpha - cyclopentyl-N,N-dimethylbenzylamine.

No references cited.

CHARLES B. PARKER, *Primary Examiner.*